(12) United States Patent
Scherer et al.

(10) Patent No.: US 7,526,916 B2
(45) Date of Patent: May 5, 2009

(54) DRIVE TRAIN

(75) Inventors: Roland Scherer, Crailsheim (DE);
Markus Bischoff, Michelbach (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 163 days.

(21) Appl. No.: 11/499,099

(22) Filed: Aug. 4, 2006

(65) Prior Publication Data

US 2007/0033931 A1 Feb. 15, 2007

(30) Foreign Application Priority Data

Aug. 5, 2005 (DE) .................. 10 2005 037 640

(51) Int. Cl.
*F16D 33/06* (2006.01)
(52) U.S. Cl. .................. 60/337; 60/358
(58) Field of Classification Search .......... 60/330, 60/337, 358
See application file for complete search history.

(56) References Cited

U.S. PATENT DOCUMENTS 5,535,818 A * 7/1996 Fujisaki et al. ......... 165/104.33
6,267,705 B1 * 7/2001 Rose et al. ............... 477/92

FOREIGN PATENT DOCUMENTS

| DE | 196 03 184 A1 | 7/1997 |
|----|---------------|--------|
| DE | 197 19 299 C1 | 8/1998 |
| DE | 198 13 532 C1 | 9/1999 |
| DE | 198 31 922 A1 | 1/2000 |
| DE | 100 09 959 A1 | 8/2000 |
| DE | 101 40 220 A1 | 5/2003 |

* cited by examiner

*Primary Examiner*—Michael Leslie
(74) *Attorney, Agent, or Firm*—Ohlandt, Greeley, Ruggiero & Perle, L.L.P.

(57) ABSTRACT

A drive train having a hydrodynamic machine and a cooling medium circuit with a liquid or gaseous cooling medium. The hydrodynamic machine has at least one primary impeller, a secondary impeller, at least one control valve, and a control unit. The control unit actuates the at least one control valve in order to control the flow of the working medium into or out of the hydrodynamic machine. The secondary impeller and the at least one primary impeller form a working chamber that can be filled with a working medium. The cooling medium circuit is configured to cool the working medium and the control unit.

10 Claims, 2 Drawing Sheets

DRIVE TRAIN

CROSS-REFERENCE TO RELATED APPLICATIONS

This application claims the benefit under 35 U.S.C. §119 (a) of German Application Serial No. 10 2005 037 640.1, filed Aug. 5, 2005, the entire contents of which are incorporated by reference herein.

BACKGROUND OF THE INVENTION

1. Field of the Invention

The invention relates to a drive train, particularly a vehicle drive train, which has a hydrodynamic machine and a cooling medium circuit, the cooling medium being at the same time the working medium of the hydrodynamic machine.

2. Description of Related Art

Drive trains, particularly motor vehicle drive trains having hydrodynamic machines are known in a plurality of designs. For example, hydrodynamic brakes, so-called retarders, are used nowadays in heavy-duty motor vehicles for wear-free braking of the vehicle.

Such hydrodynamic machines, particularly retarders, have a working chamber, which can be filled with a working medium in order to transmit torque or driving power, respectively, without any wear, from a primary impeller to a secondary impeller of the hydrodynamic machine—for example, from the rotor to the stator of the retarder. Corresponding to the desired power transmission, a specific quantity of working medium is conducted into the working chamber of the hydrodynamic machine. The carrying of the working medium into the hydrodynamic machine, out of it, and/or within the hydrodynamic machine is controlled by at least one control valve and, as a rule, by several control valves. The one or more control valve(s), which are designed, for example, as solenoid valves, may, in turn, be actuatable by at least one control unit associated therewith—for example, by a flow of current through the magnet coil in the respective solenoid. The control valves are incorporated in a control air system or compressed air system, for example, and control the compressed air state in specific sections, particularly line sections, of the control air system. The air from the control air system controls regulating or shutoff valves and/or collars and/or flaps in the working medium circuit of the hydrodynamic machine—for example, an inlet valve and/or an outlet valve for a retarder or, in general, a hydrodynamic machine. Accordingly, air (or also another control medium) flows through the control valves, in contrast to the valves, collars, or flaps in the working medium circuit, which are switched by the control air.

The control unit comprises electronic components, which are subjected to heating during power operation. In order to be able to fabricate the control unit at an economically practical cost from comparatively inexpensive materials, the maximum allowable temperature of the control unit is limited. The temperature of the control unit is then a function of the ambient temperature as well as the extent of self-warming. Nowadays, for example, it is usual in the motor vehicle sector to limit the maximum ambient temperature in the engine compartment in which the control unit is disposed to 120° C., so that an inadmissible heating of the electronic components of the control unit is prevented.

In recent times, however, vehicle manufacturers have striven to allow higher ambient temperatures in the vehicle— for example, a temperature range of 40° C. (under Arctic conditions, from −50° C.) to over 120° C. Because of this, the higher continuously allowed ambient temperatures result in limitations in the allowable maximum period of time that the electronic control unit of hydrodynamic machines may be turned on as well as, in particular, the control valves thereof, which are designed as solenoid valves, because the allowable temperature range for self-heating is correspondingly reduced by the difference of the higher ambient temperature with respect to the previously maximum allowable ambient temperature. Due to the limitation of the maximum allowable period of time for operation over a pre-given time interval, the self-heating is reduced and accordingly the maximum allowable temperature of the materials of the electronic control unit or of the control valves and/or the surroundings thereof is maintained.

Such limitation of the operating time, for example, by a time-dependent switching on of the control unit and/or by a time-dependent actuation of the valves by way of an advance setting of defined time pauses between individual actuations or by way of pulse-width modulation, has a detrimental effect on the availability of the hydrodynamic machine and is accordingly undesirable.

BRIEF SUMMARY OF THE INVENTION

The invention is based on the problem of providing a drive train having a hydrodynamic machine with at least one control valve, which may be actuated by at least one associated control unit, in which the availability of the hydrodynamic machine is not limited despite the use of conventional low-cost materials for the control unit and/or the control valve, particularly without a shortening of the lifetime of individual electronic components in comparison with conventional designs.

The inventive drive train has a hydrodynamic machine, which comprises at least one primary impeller and one secondary impeller, which together form a working chamber, particularly a toroidal working chamber, that can be filled with a working medium. Here, as a rule, there is provided at least one control valve, with which the conducting of the working medium in the hydrodynamic machine or into or out of the hydrodynamic machine can be controlled. The control valve is actuated by a control unit that is associated with it. For example, the control valve can take the form of a solenoid valve, which has a coil that generates a magnetic field and is supplied with a pre-given electrical power by the associated control unit. The control valve, for example, may be a component of a control air or compressed air system, by means of which valves or switching or shutoff devices that conduct working medium can be actuated in the working medium circuit.

In general, however, it is also conceivable to actuate directly by the electronic control unit one or more valves or switching devices that conduct working medium and are arranged in the working medium circuit of the hydrodynamic machine.

As a rule, the hydrodynamic machine comprises a plurality of control valves, which may be actuated by a single control unit or by several associated control units independently of or dependently on one another.

The inventive drive train has a cooling medium circuit in which a liquid or gaseous cooling medium circulates, particularly being circulated by means of a cooling medium pump. As a rule, the cooling medium circuit is provided with at least one heat exchanger—for example, a vehicle radiator—with which heat is dissipated from the cooling medium into the surroundings. The cooling medium may be at the same time the working medium of the hydrodynamic machine, which is designed as a hydrodynamic retarder, for example, and, accordingly, the working chamber thereof can be filled with the working medium in braking operation, and, in non-braking operation, it can be completely drained or else drained up to a pre-given residual quantity of working medium. In particular, the hydrodynamic machine is designed as a secondary water retarder, that is, as a retarder that is arranged on the gearbox output side and which can be designed with water or with a water mixture as the working medium.

In accordance with the invention, the hydrodynamic machine has at least one electronic modular unit, comprising heat-sensitive electronic components, which serves, in particular, for the control and/or monitoring of the hydrodynamic machine or of pre-given states in the hydrodynamic machine. The electronic modular unit is, in particular, the described control unit, which actuates the one or more control valve(s) mentioned.

In accordance with the invention, the electronic modular unit and/or the at least one control unit are arranged in or on the cooling medium circuit in such a way that heat is dissipated to the surroundings from the electronic modular unit and/or the control unit by circulation of the cooling medium of the cooling medium circuit around and/or past the modular unit and/or the control unit via the cooling medium circuit and, in particular, the heat exchanger or vehicle radiator provided therein.

In the following, for reasons of simplicity, the invention will be described on the basis of the inventive cooling, particularly liquid cooling, of the control unit, whereby the same features or measures can be provided generally for the mentioned electronic modular unit.

For example, the control unit can have a surface that is cooled by the cooling medium, the temperature of this surface being kept, in particular, constant or essentially constant or at least not exceeding a pre-given maximum temperature. The control unit can be disposed inside of a housing, past which or around which the cooling medium flows. In addition, one or a plurality of control valves can be positioned inside of the housing, these control valves being actuated, in particular, by this control unit.

The control unit and/or the control valves (or, in general, the electronic modular unit), for example, may have a housing with a surface element that protrudes into the cooling medium circuit. For example, the housing may be provided with external cooling ribs, whereby cooling medium flows around these cooling ribs.

In general, the control unit and/or the control valve or valves can be positioned in a suitable compartment built in the drive train or in the vehicle, past which or around which the cooling medium flows.

The temperature of the control unit accordingly adjusts itself in accordance with a heat transfer from the control unit to the cooling medium of the vehicle or, during a so-called cold start, from the cooling medium to the control unit. The same holds true, in particular, for the control valves that are integrated with the control unit in a common control module and/or a common housing, for example. The temperature course of the control unit or of the control valves, respectively, is accordingly averaged out in comparison to conventional designs and this has a positive effect on the lifetime of the component parts used.

The invention will be described below on the basis of an embodiment example and the exemplary figures.

DETAILED DESCRIPTION OF THE INVENTION

Figure 1:
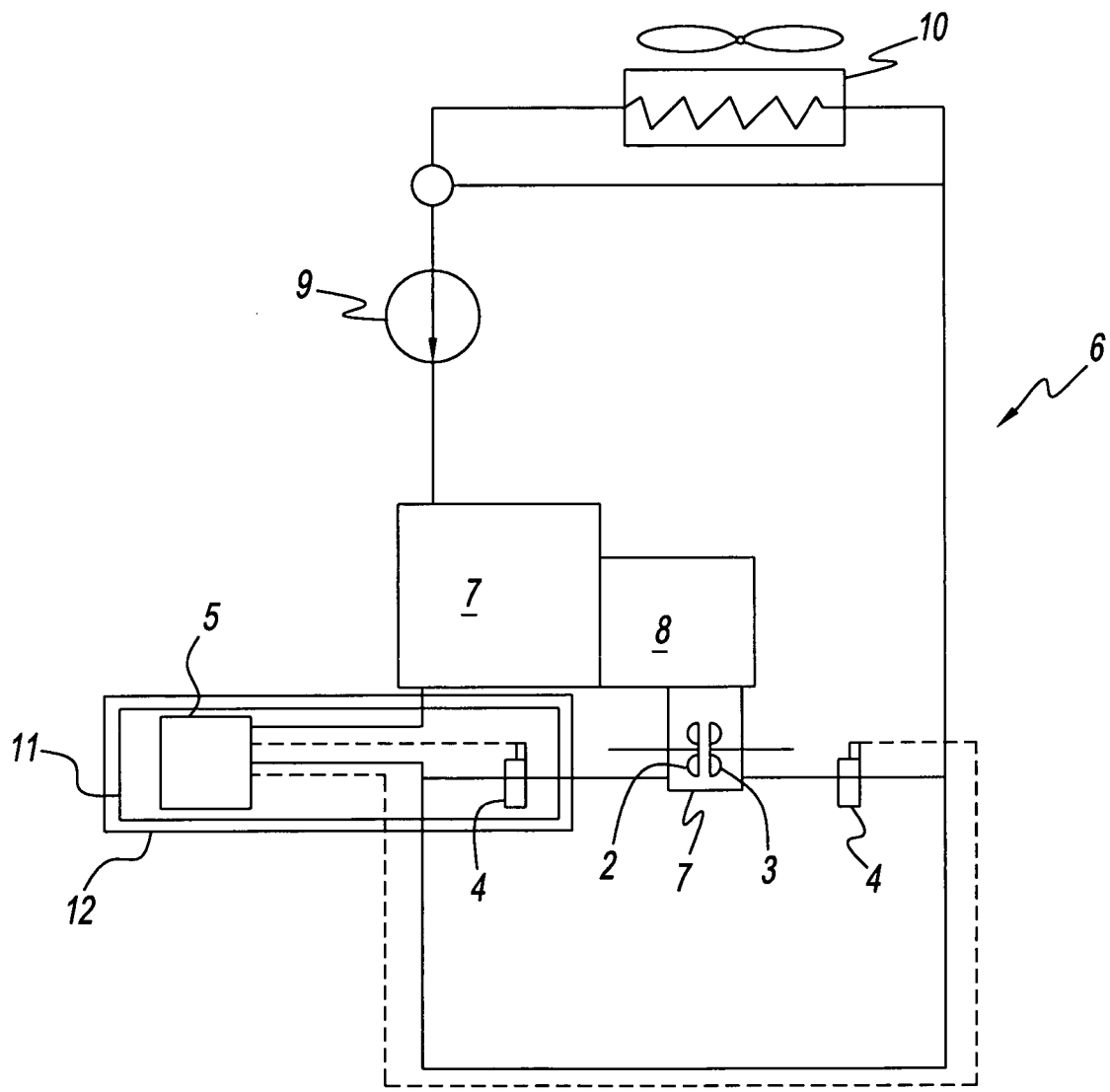
FIG. 1 is a first embodiment of a motor vehicle drive train according to the present disclosure.

FIG. 1 shows various components of a motor vehicle drive train, namely, an internal combustion engine 7, which drives the driving wheels of a motor vehicle (not depicted) via a gearbox 8 connected thereto. Connected to the gearbox 8 in driven connection with the engine 7 is the hydrodynamic machine 1, which, here, takes the form of a hydrodynamic retarder and which has a primary impeller 2 and a secondary impeller 3, which together form a toroidal working chamber that can be filled with the cooling medium of the cooling medium circuit 6, which is at the same time the working medium of the hydrodynamic machine 1, in order to brake the motor vehicle without any wear.

The cooling medium, here water or a water mixture, of the cooling medium circuit 6 is circulated by means of a water pump 9 and, in the braking operation, of the hydrodynamic machine 1, additionally flows around the latter in the cooling medium circuit 6. The heat is dissipated from the cooling medium into the surroundings by means of the motor vehicle radiator 10.

The filling and draining of the working chamber of the hydrodynamic machine 1 is controlled by the control valves 4. The control valves are arranged in a control air system (not depicted), whereby the elements of the hydrodynamic machine that conduct working medium—or example, inlet and outlet valves (not depicted)—are controlled or actuated by the control air system. These control valves 4 are designed as solenoid valves and are actuated by the control unit 5. Both the control unit 5 and the control valves 4 are in direct heat-transmitting connection with the cooling medium of the cooling circuit 6; that is, they have, for example, a housing, particularly one with a wall thickness of only a few millimeters (mm)—for example, 0.3 to 2 mm or 0.5 to 1.5 mm, past which or around which the cooling medium flows directly. Thus, advantageously, cooling medium flows around both the control unit 5 and the control valves 4, which are arranged, for example, in a common control module 11 and/or a common housing 12. In particular, cooling medium impinges on at least one essential region of the control module or of the control housing—for example, at least a side surface.

As is seen, the hydrodynamic machine 1, viewed in the flow direction of the cooling medium in the cooling circuit 6, is arranged downstream of the internal combustion engine 7 and the control unit 5 is arranged, particularly together with one or more or all of the control valves 4, in the region of the inlet of the cooling medium into the hydrodynamic machine 1, that is, at least in such a region of the hydrodynamic machine 1 that has the temperature of the cooling medium, when it enters the retarder—for example, 105° C.—or a temperature that lies above this by a maximum amount of, for example, 5, 10, or 15° C.

Figure 2:
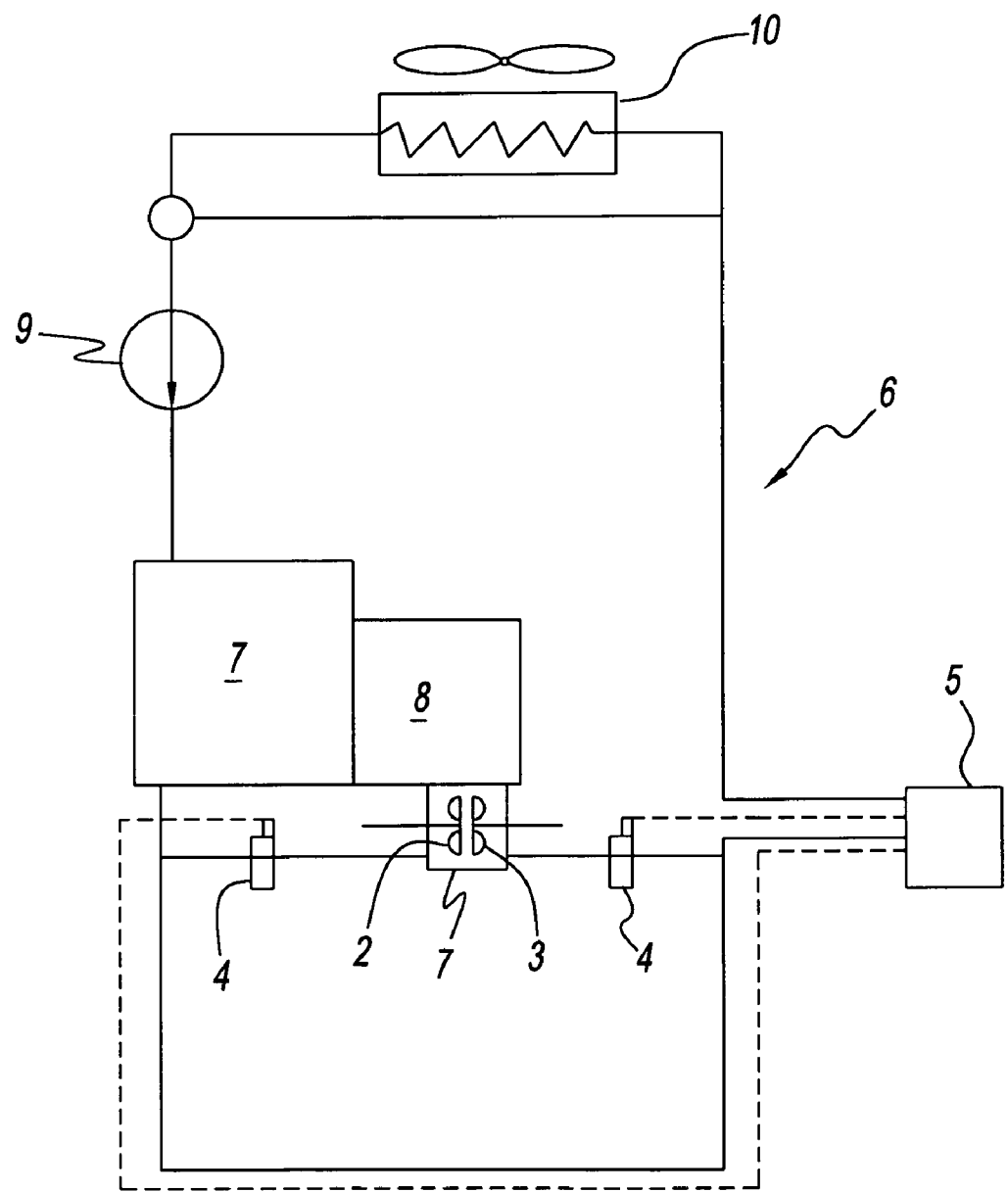
FIG. 2 is a second embodiment of a motor vehicle drive train according to the present disclosure.

FIG. 2 shows an alternative embodiment of the motor vehicle drive train having various components, namely, an internal combustion engine 7, which drives the driving wheels of a motor vehicle (not depicted) via a gearbox 8 connected thereto. As is illustrated, it is also possible to arrange the control unit 5 and/or the control valves 4 in the region of the outflow of the cooling medium out of the hydrodynamic machine 1 or in such a component part of the hydrodynamic machine 1 that exhibits the temperature of the cooling medium that exits the hydrodynamic machine 1—for example, 110° C.—or a temperature that lies above this temperature by a pre-given difference of, for example, 5, 10, or 15° C. above the temperature of the exiting cooling medium.

In general, it is advantageous when the cooling medium, particularly the working medium, is carried to the hydrodynamic machine 1, then to the control unit 5 and/or to the control valves 4 (or generally to the electronic control unit) when it still has a comparatively low temperature. The lower the temperature is, the more heat can be dissipated from the components, particularly the electronic components—for example, the electronic components of the control unit 5 or the magnet coils of the control valves 4. At the same time, the heat input into the cooling medium due to this heat dissipation is so low that component parts that are to be subsequently cooled in the cooling medium circuit are not affected detrimentally by this heat input. It is advantageous, therefore, when the cooling medium is conducted first to the control unit 5 and/or to the control valves 4 before it enters the working chamber of the hydrodynamic machine 1. The cooling medium that is conducted to the control unit 5 and/or to the control valves 4 (in general, to the electronic modular unit in the region of the hydrodynamic machine 1) can either, as depicted, have been conducted beforehand through the internal combustion engine 7 to cool the latter or alternatively it can be diverted in a bypass (not depicted) around the internal combustion engine 7, so that, in the latter case, it exhibits essentially the temperature it had after leaving the water pump 9.

By way of the inventive embodiment of the drive train, it is possible, for example, to provide for ambient temperatures of 140° C. or above, particularly in the engine compartment of a motor vehicle.

The invention claimed is:

1. A drive train comprising:
    a hydrodynamic machine, comprising:
        at least one primary impeller;
        a secondary impeller, said secondary and said at least one primary impeller forming a working chamber that can be filled with a working medium;
        at least one control valve;
        a control unit for actuating said at least one control valve in order to control the flow of the working medium into or out of said hydrodynamic machines wherein said control unit comprises at least one electronic modular unit controlling and/or monitoring said hydrodynamic machine or a pre-given state in the latter, a cooling medium circuit being configured to cool said at least one electronic modular unit;
        said cooling medium circuit with a liquid or gaseous cooling medium, said cooling medium circuit being configured to cool the working medium and said control unit, wherein the or gaseous cooling medium is the working medium; and
    an engine, said hydrodynamic machine is connected in said cooling medium circuit in series with said engine so that the liquid or gaseous cooling medium flows through said hydrodynamic machine and said engine, and wherein said control unit and said at least one control valve are arranged in a cooling medium inlet region of said hydrodynamic machine, wherein said hydrodynamic machine is arranged in said cooling medium circuit downstream of said engine.

2. The drive train according to claim 1, wherein said said cooling medium circuit is configured to cool said at least one control valve.

3. The drive train according to claim 1, wherein said control unit and said at least one control valve are integrated in a common control module and are enclosed by a common housing.

4. The drive train according to claim 1, wherein said at least one control valve is a solenoid valve.

5. The drive train according to claim 1, wherein said hydrodynamic machine is a retarder.

6. A drive train comprising:
    a hydrodynamic machine, comprising:
        at least one primary impeller;
        a secondary impeller, said secondary and said at least one primary impeller forming a working chamber that can be filled with a working medium;
        at least one control valve;
        a control unit for actuating said at least one control valve in order to control the flow of the working medium into or out of said hydrodynamic machine, wherein said control unit comprises at least one electronic modular unit controlling and/or monitoring said hydrodynamic machine or a pre-given state in the latter, a cooling medium circuit being configured to cool said at least one electronic modular unit;
        said cooling medium circuit with a liquid or gaseous cooling medium, said cooling medium circuit being configured to cool the working medium and said control unit, wherein the liquid or gaseous cooling medium is the working medium; and
    an engine, said hydrodynamic machine is connected in said cooling medium circuit in series with said engine so that the liquid or gaseous cooling medium flows through said hydrodynamic machine and said engine, and wherein said control unit and said at least one control valve are arranged in a cooling medium outlet region of said hydrodynamic machine, wherein said hydrodynamic machine is arranged in said cooling medium circuit downstream of said engine.

7. The drive train according to claim 6, wherein said said cooling medium circuit is configured to cool said at least one control valve.

8. The drive train according to claim 6, wherein said control unit and said at least one control valve are integrated in a common control module and are enclosed by a common housing.

9. The drive train according to claim 6, wherein said at least one control valve is a solenoid valve.

10. The drive train according to claim 6, wherein said hydrodynamic machine is a retarder.

* * * * *